United States Patent
Vishwajeet et al.

(10) Patent No.: US 11,035,943 B2
(45) Date of Patent: Jun. 15, 2021

(54) RADAR BASED TRACKING OF SLOW MOVING OBJECTS

(71) Applicant: APTIV TECHNOLOGIES LIMITED, St. Michael (BB)

(72) Inventors: Kumar Vishwajeet, Pasadena, CA (US); Jan K. Schiffmann, Newbury Park, CA (US); Wenbing Dang, Nonth Hollywood, CA (US); Keerthi Raj Nagaraja, San Francisco, CA (US); Franz P. Schiffmann, Port Hueneme, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 245 days.

(21) Appl. No.: 16/039,890

(22) Filed: Jul. 19, 2018

(65) Prior Publication Data

US 2020/0025902 A1    Jan. 23, 2020

(51) Int. Cl.
  *G01S 13/536*    (2006.01)
  *G01S 13/931*    (2020.01)

(52) U.S. Cl.
  CPC .......... *G01S 13/536* (2013.01); *G01S 13/931* (2013.01); *G01S 2013/932* (2020.01)

(58) Field of Classification Search
  CPC . G01S 13/536; G01S 13/931; G01S 2013/932
  USPC ......................................................... 342/28
  See application file for complete search history.

(56) References Cited

U.S. PATENT DOCUMENTS

| | | | |
|---|---|---|---|
| 9,898,677 B1 * | 2/2018 | An jelkovi ......... | G06K 9/00771 |
| 10,216,189 B1 * | 2/2019 | Haynes .............. | G06K 9/00805 |
| 10,332,391 B2 * | 6/2019 | Fowe ................... | G08G 1/0133 |
| 2003/0225517 A1 * | 12/2003 | Schiffmann ........... | G01S 13/505 |
| | | | 701/301 |
| 2005/0225477 A1 * | 10/2005 | Cong ................. | B60K 31/0066 |
| | | | 342/70 |
| 2007/0241955 A1 * | 10/2007 | Brosche ................ | G01S 13/325 |
| | | | 342/128 |

(Continued)

FOREIGN PATENT DOCUMENTS

| | | | | |
|---|---|---|---|---|
| WO | 2007/111512 A1 | | 10/2007 | |
| WO | WO-2007111512 A1 | * | 10/2007 | ............. G01S 7/415 |
| WO | WO-2008093092 A2 | * | 8/2008 | ........... G01S 13/726 |

OTHER PUBLICATIONS

European Search Report for Application No. 19183555, European Patent Office, dated Nov. 7, 2019.

*Primary Examiner* — Vladimir Magloire
*Assistant Examiner* — Nuzhat Pervin
(74) *Attorney, Agent, or Firm* — Carlson, Gaskey & Olds, P.C.

(57) ABSTRACT

An illustrative example method of classifying a detected object includes detecting an object, determining that an estimated velocity of the object is below a preselected threshold velocity requiring classification, determining a time during which the object has been detected, determining a first distance the object moves during the time determining a speed of the object from the first distance and the time, determining a second distance that a centroid of the detected object moves during the time, and classifying the detected object as a slow moving object or a stationary object based on a relationship between the first and second distances and a relationship between the estimated velocity and the speed.

18 Claims, 4 Drawing Sheets

(56) References Cited

U.S. PATENT DOCUMENTS

| | | | |
|---|---|---|---|
| 2007/0285303 A1* | 12/2007 | Radza | G01S 13/72 |
| | | | 342/62 |
| 2008/0172156 A1* | 7/2008 | Joh | G01S 13/931 |
| | | | 701/45 |
| 2010/0104199 A1* | 4/2010 | Zhang | G08G 1/165 |
| | | | 382/199 |
| 2010/0109938 A1* | 5/2010 | Oswald | G01S 13/522 |
| | | | 342/90 |
| 2011/0282581 A1* | 11/2011 | Zeng | G01S 7/4808 |
| | | | 701/301 |
| 2012/0200446 A1* | 8/2012 | Shirakawa | G01S 7/40 |
| | | | 342/27 |
| 2013/0132005 A1* | 5/2013 | Welle | G06F 17/00 |
| | | | 702/55 |
| 2015/0276923 A1* | 10/2015 | Song | G01S 7/4026 |
| | | | 702/97 |
| 2016/0103213 A1* | 4/2016 | Ikram | G01S 13/42 |
| | | | 342/105 |
| 2017/0057474 A1* | 3/2017 | Zeng | B60T 7/22 |
| 2017/0097412 A1* | 4/2017 | Liu | G01S 13/726 |
| 2017/0302909 A1* | 10/2017 | Finn | G01C 25/00 |
| 2018/0096595 A1* | 4/2018 | Janzen | G06K 9/0063 |
| 2018/0158326 A1* | 6/2018 | Fowe | G08G 1/0133 |
| 2018/0251092 A1* | 9/2018 | Lee | G01S 13/60 |
| 2019/0079526 A1* | 3/2019 | Vallespi-Gonzalez | |
| | | | G01S 17/931 |
| 2019/0179027 A1* | 6/2019 | Englard | G06T 7/50 |
| 2020/0043176 A1* | 2/2020 | Maila | G01S 17/931 |

\* cited by examiner

RADAR BASED TRACKING OF SLOW MOVING OBJECTS

BACKGROUND

Modern day vehicles include a variety of sensors and detectors that provide information regarding the environment or vicinity around a vehicle. For example, radar tracking devices provide information regarding objects in a vicinity or pathway of a vehicle. Such information is useful for driver assistance features. In some cases, automated or semi-automated vehicle operation is possible based on such information. For example, adaptive cruise control and parking assist features are known that automatically control speed or movement of a vehicle based on such sensor input. Autonomous or automated vehicles that are self-driving may utilize such information.

While radar and other sensor devices have proven useful, there are limitations on the type or accuracy of information available from them. For example, sensors have limitations at lower speeds, particularly when there is little relative motion between the sensor and a tracked object. When an object is moving at a lower speed, the detections from the radar device may be ambiguous, making the object difficult to classify as moving or stationary. Because of these ambiguous detections, identification of slow moving objects, such as pedestrians or slow moving cars, may be a challenging task.

SUMMARY

An illustrative example method of classifying a detected object includes detecting an object, determining that an estimated velocity of the object is below a preselected threshold velocity requiring classification, determining a time during which the object has been detected, determining a first distance the object moves during the time, determining a speed of the object from the first distance and the time, determining a second distance that a centroid of the detected object moves during the time, and classifying the detected object as a slow moving object or a stationary object based on a relationship between the first and second distances and a relationship between the estimated velocity and the speed.

An illustrative example system for tracking a slow moving object includes a tracking device configured to detect an object and a processor. The processor is configured to determine that an estimated velocity of the object is below a preselected threshold velocity requiring classification, determine a time during which the object has been detected, determine a first distance the object moves during the time, determine a speed of the object from the first distance and the time, determine a second distance that a centroid of the object moves during the time, and classify the object as a slow moving object or a stationary object based on a relationship between the first and second distances and a relationship between the estimated velocity and the speed.

The various features and advantages of at least one disclosed example embodiment will become apparent to those skilled in the art from the following detailed description. The drawings that accompany the detailed description can be briefly described as follows.

DETAILED DESCRIPTION

Figure 1:
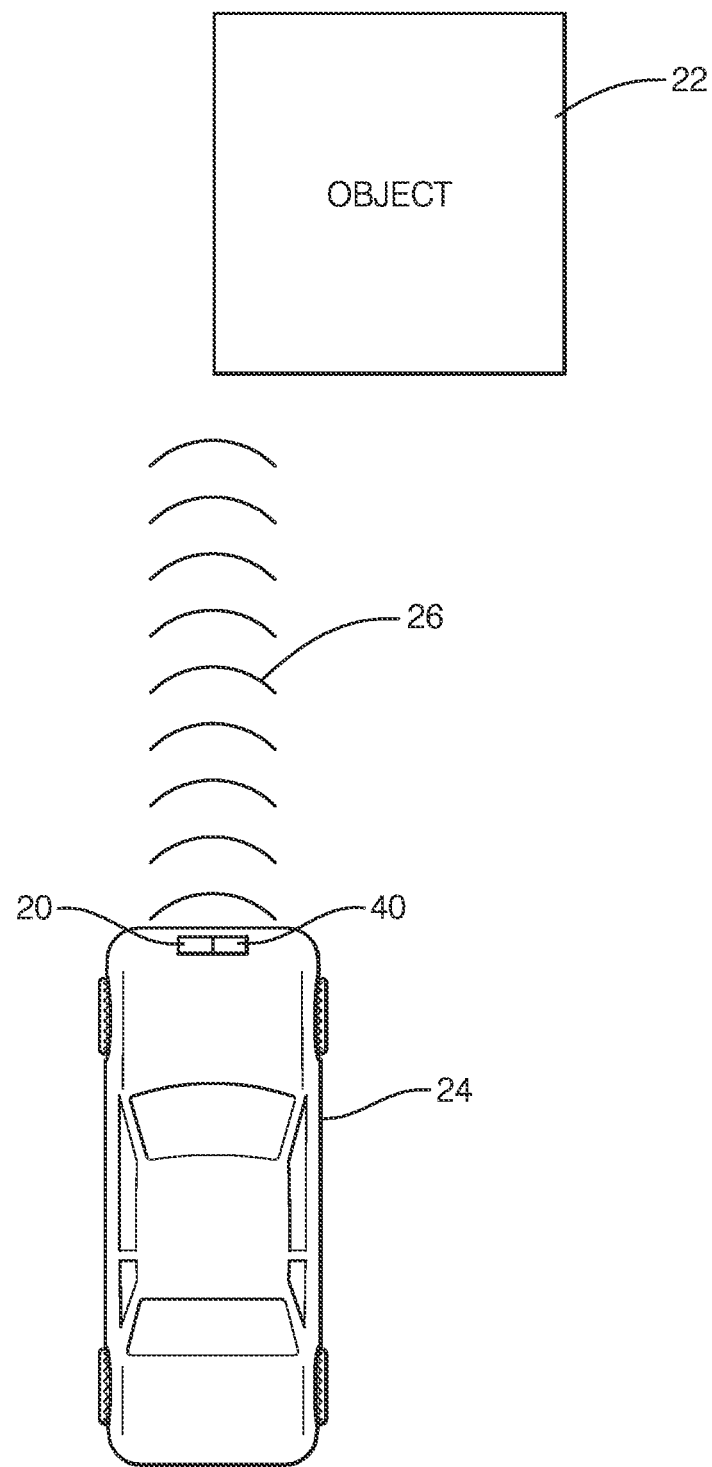
FIG. 1 diagrammatically illustrates an example use of a system for tracking a moving object designed according to an embodiment of this invention.

FIG. 1 diagrammatically illustrates a system 20 for detecting or tracking an object 22. In this example, the system 20 comprises a tracking device 40 situated on a host vehicle 24. The host vehicle 24 may be an autonomous vehicle in some examples. The system 20 determines information about the object 22 to classify the object. For example, an object 22 may be classified as a stationary object if it is a building or sign, or as a moving object if it is another vehicle or bicyclist. One challenge presented by objects moving slowly is that they can be misclassified as stationary. The system 20 determines information about such an object 22 and compares it to several criteria to determine when to classify the object 22 as a slow moving object. In some instances, the object 22 is a pedestrian. The system 20 in some embodiments is configured to use additional criteria to classify pedestrians as slow moving objects.

The system 20 uses known radar signaling as schematically shown at 26 for detecting several characteristics of the object 22. In an example, the system 20 includes four short range radar detectors, and a forward looking radar detector. The system 20 determines characteristics of the object 22 based on the detections it receives and any known information, such as the position and speed of the system 20.

Figure 2:
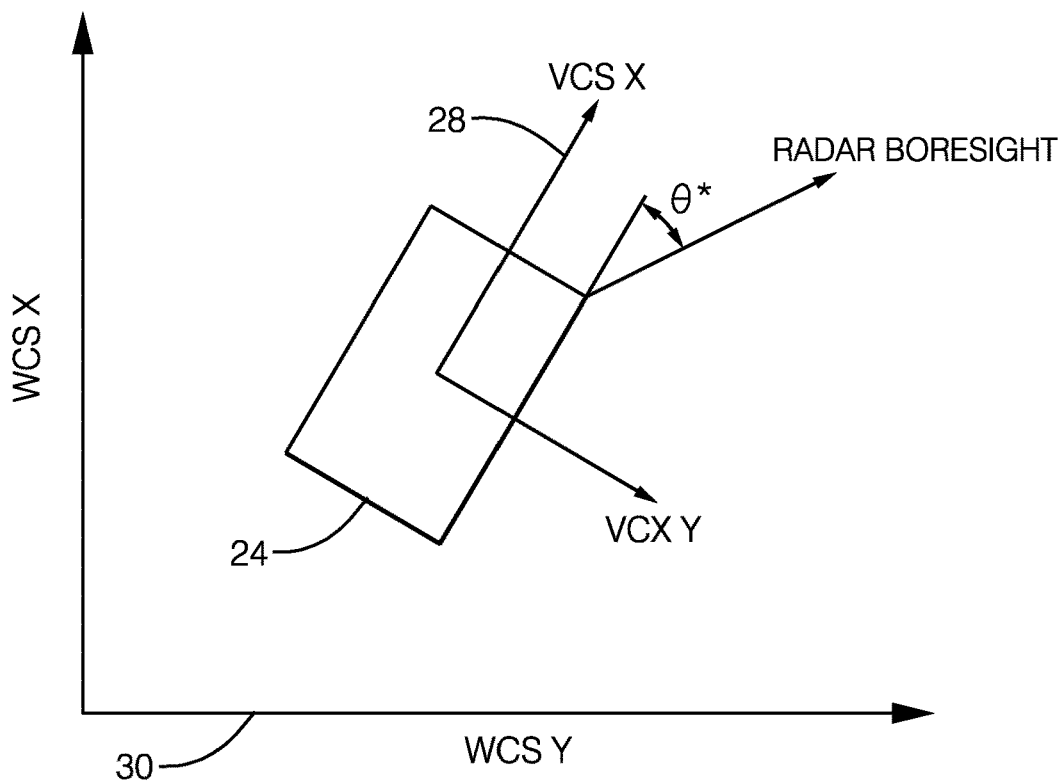
FIG. 2 schematically illustrates various characteristics of the system according to an example of this invention.

As shown in FIG. 2, the host vehicle 24 has its own host vehicle coordinate system (VCS) 28, which is positioned in a world coordinate system (WCS) 30. Each of the detections of the system 20 is in a frame of reference. The radar detectors of the system 20 each have a mounting position and boresight angle that are known with respect to the vehicle coordinate system 28. Generally, every detection generated by the system 20 can be characterized by a range R, a range rate $\dot{R}$, and an azimuth θ. These detection parameters are converted to the vehicle coordinate system 28, which can then be converted to the world coordinate system 30. The speed of the host vehicle 24, its orientation with respect to the world coordinate system 30, and the parameters in the radar detector frame of reference are used to compute a compensated range rate $\dot{R}_c$ for each detection.

The compensated range rate $\dot{R}_c$ is the radial component of the over-the-ground velocity of the object 22. When this component of the velocity is large enough, a velocity vector of the object 22 is clearly determined and the object 22 can be classified as a moving object. However, when the compensated range rate $\dot{R}_c$ does not exceed a threshold, some known systems may classify the object as ambiguous. In such situations, it is unclear from the compensated range rate $\dot{R}_c$ whether the velocity vector itself is small, which would indicate a stationary object, or whether the velocity vector is large in the non-radial direction, which would indicate a moving object. These ambiguous detections can sometimes lead to a slow moving object being misclassified as stationary. As discussed below, the disclosed system 20 evaluates additional parameters to help achieve a more accurate classification of such objects 22.

Figure 3:
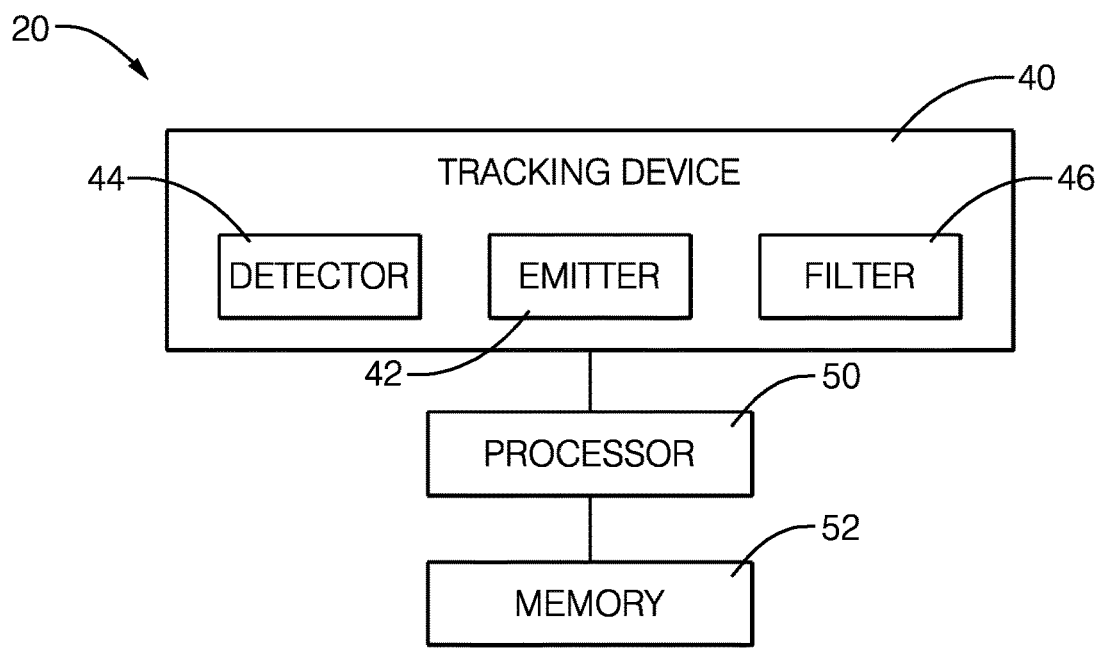
FIG. 3 schematically illustrates selected portions of an example embodiment of a system for tracking an object designed according to an embodiment of this invention.

FIG. 3 schematically illustrates selected portions of the system 20. A tracking device 40 includes an emitter 42 and detector 44. The emitter 42 emits radiation in an outward direction and, when such radiation reflects off of an object, such as object 22, that reflected radiation is received and detected by the detector 44. In some example embodiments, the emitter 42 and detector 44 operate according to known radar principles and techniques. Other embodiments include emitter and detector configurations that are useful for lidar or ultrasonic detection techniques.

The tracking device 40 includes at least one filter 46 that is configured for estimating dynamic quantities of the tracked object 22. In some example embodiments, the filter 46 operates according to known principles of Kalman filters. A Kalman filter may estimate the position, heading angle, speed, curvature, acceleration, and yaw rate of the object 22, for example. These quantities may be referred to as the object's state variables. In other example embodiments, the filter 46 operates according to known principles of Low Pass Filters. A Low Pass Filter may estimate velocity, for example. In a further embodiment, the device 40 operates according to principles of both a Kalman filter and a Low Pass Filter. In such examples, the filter 46 estimates the object's state variables with a Kalman filter and estimates a speed of the object using a Low Pass filter, which relies on the position estimates from the Kalman filter.

The system 20 includes a processor 50, which may be a dedicated microprocessor or a portion of another computing device supported on the vehicle 24. Memory 52 is associated with the processor 50. In some example embodiments, the memory 52 includes computer-executable instructions that cause the processor 50 to operate for purposes of tracking an object, such as object 22, and determining how to classify that object. In some example embodiments, the memory 52 at least temporarily contains information regarding various features or characteristics of the tracked object 22, such as its state variables, to facilitate the processor 50 making desired determinations regarding the object 22.

Figure 4:
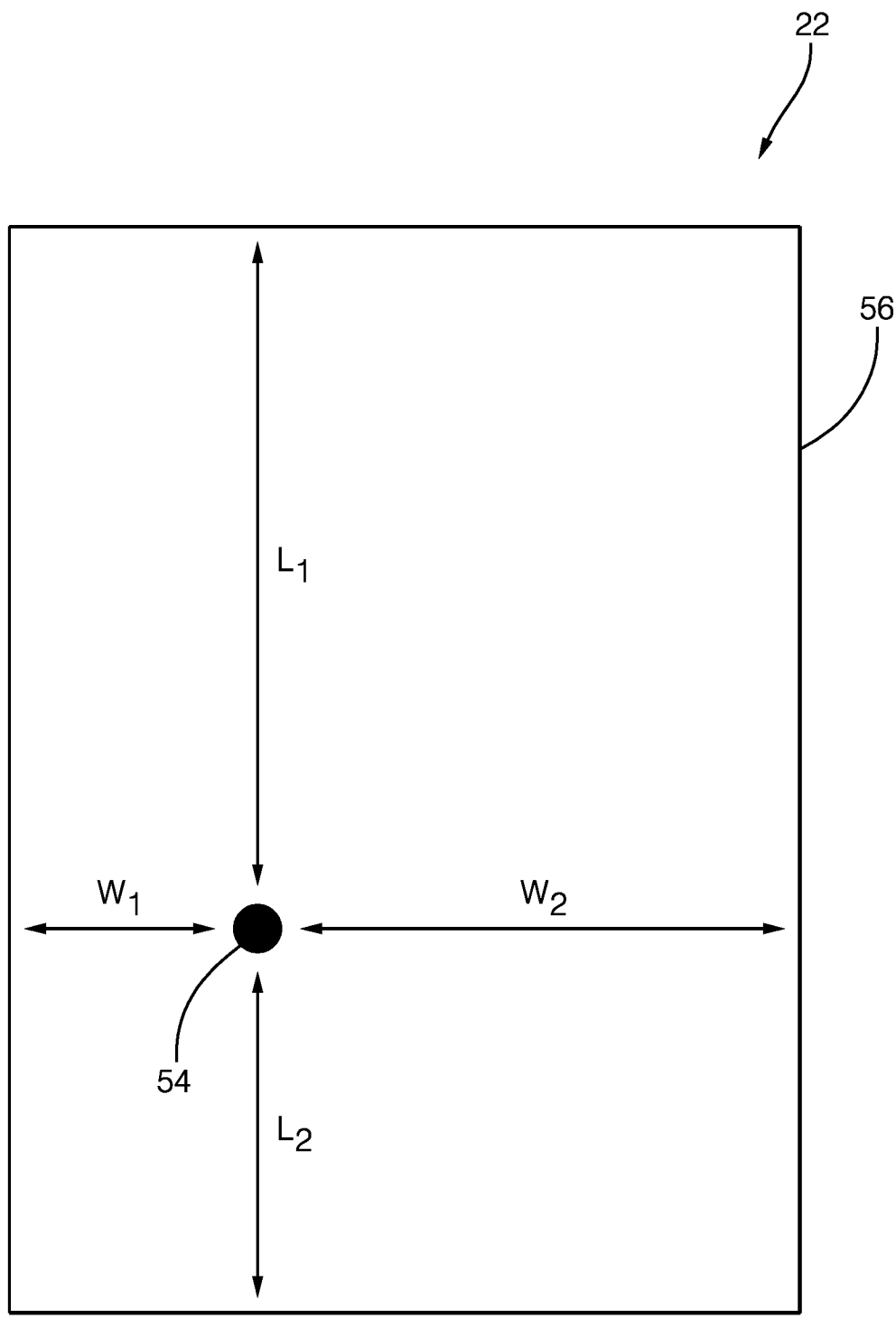
FIG. 4 schematically illustrates various characteristics of a moving object.

As illustrated in FIG. 4, the tracked object 22 is represented using a bounding box 56 having a centroid 54. Tracking in two dimensions allows the object 22 to be represented by a rectangular bounding box 56. There are known tracking techniques for determining a bounding box 56 corresponding to the edges of the object 22 and for locating the centroid 54 within that bounding box 56. The bounding box 56 is parameterized by a length L and a width W. The dimensions $L_1$, $L_2$, $W_1$, and $W_2$ indicate the position of the centroid 54 relative to the edges of the body of the object 22. The length L of the bounding box 56 is equal to the sum of $L_1$ and $L_2$ and the width W is equal to the sum of $W_1$ and $W_2$.

Stationary or slowly moving objects can be of varying sizes and it may not be suitable to use large bounding boxes to represent them. For example, the dimensions of trees, lampposts, and overhanging objects can be quite small compared to buildings and long guardrails. It can be challenging to use bounding boxes that are representative of the true size of such objects. In some embodiments, the processor 50 assigns a bounding box 56 that is a rectangle having a preselected length L and width W to any objects that require classification as stationary or slow moving. Such objects that are larger than the preselected length L and width W may be represented by multiple bounding boxes 56. In one example, the preselected length L and width W are smaller than an average vehicle. In a further example, the preselected length L and width W are about 1 meter by about 1 meter, though smaller or larger bounding boxes 56 may fall within the scope of this disclosure. This representation of larger objects by multiple bounding boxes 56 may require increased computational cost, but provides advantages when detecting or tracking smaller objects. For example, assigning a smaller bounding box 56 may help in tracking pedestrians moving near stationary objects, such as pedestrians walking between parked cars or close to walls.

The position of the centroid 54 within the bounding box 56 may be determined in advance or determined within the bounding box 56 of the object 22 by processing the positions of radar detections of the object 22 relative to the centroid position over time. In one example, the filter 46 uses a known Nearly Coordinated Turn Constant Acceleration Motion Model to provide an estimate of a position of the centroid 56 in the world, an over-the-ground speed of the centroid 54, and the heading angle of the centroid 54. The filter 46 also provides information regarding a trajectory curvature of the centroid 54 and tangential acceleration of the centroid 54.

In this example, the object 22 is classified as either moving or stationary, depending on a number of detected characteristics, such as an estimated object velocity. Slow moving objects like pedestrians or slow moving cars can generate mostly ambiguous radar detections, and as such, can be misclassified as stationary. Slow moving objects are objects moving with an estimated speed below a preselected slow moving velocity threshold. In one example, the slow moving velocity threshold is about 3 meters per second.

Figure 5:
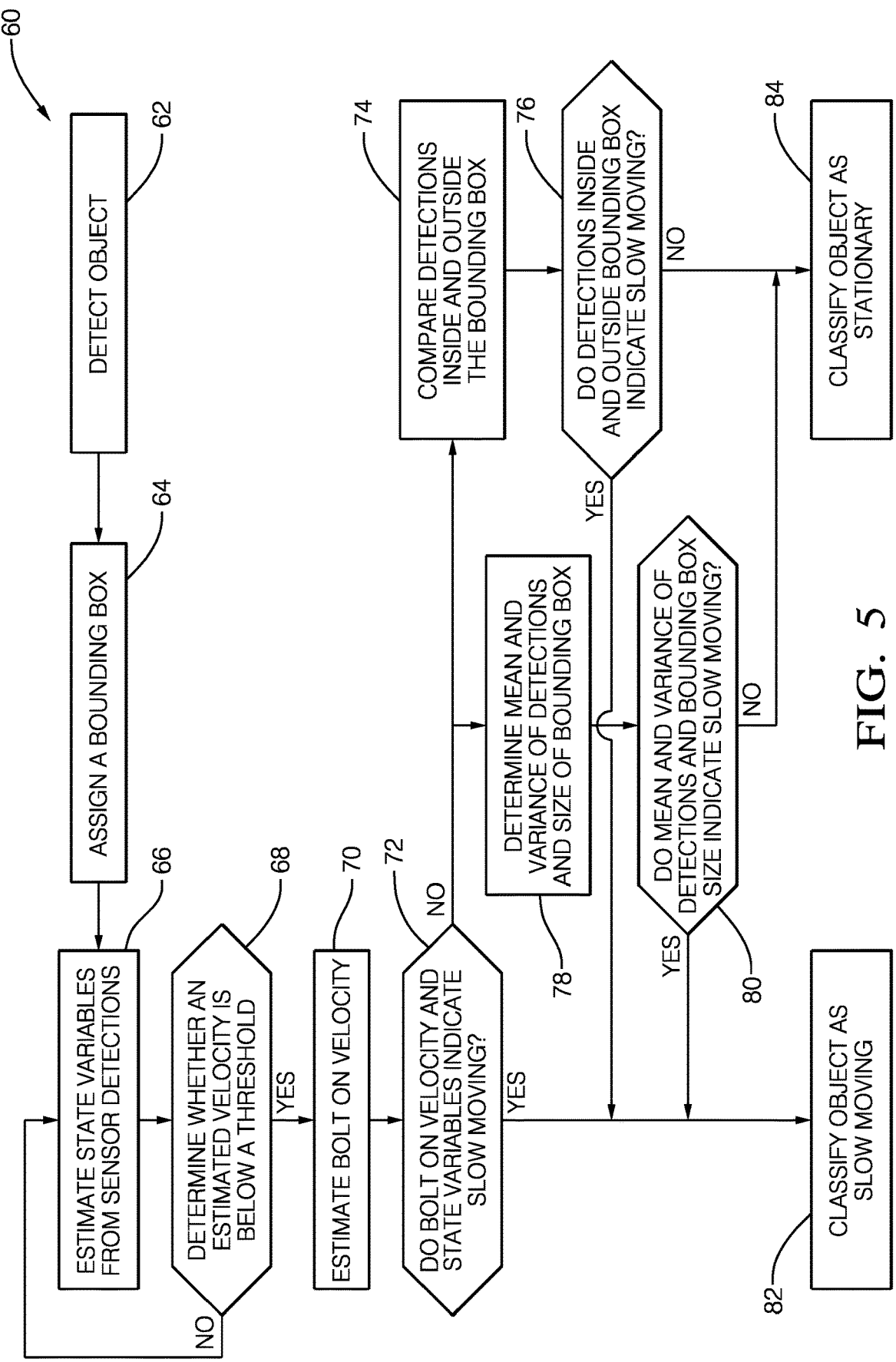
FIG. 5 is a flowchart diagram summarizing an example method of classifying a moving object.

A method of classifying an object 22 as slow moving or stationary is summarized in the flowchart 60 of FIG. 5. When the system 20 detects the object 22, it attempts to classify it as soon as possible.

The system 20 first identifies an object 22 at 62 and assigns a bounding box 56 at 64. Once a bounding box 56 has been assigned to a detected object 22, the system 20 stores information regarding the object 22 and continues to collect additional information. The system 20 determines a first distance moved by the bounding box 56 and a second distance moved by the centroid 54 in the time since the object 22 was detected at step 66. In an embodiment, the state variables determined at 66 are estimated by the filter 46 operating as a Kalman filter. The Kalman filter also estimates a velocity and the system 20 determines whether the estimated velocity is below a preselected velocity threshold at step 68. In one embodiment, the preselected velocity threshold is about 3 meters per second. When the estimated velocity is not below the threshold, the object 22 is not likely to be misclassified as stationary, and the method continues to periodically update the state variables at 64. When the estimated velocity is below the threshold, the object 22 could potentially be misclassified as stationary. To properly classify the object 22, the system 20 evaluates additional characteristics of the object 22.

In order to quickly and accurately classify the object 22, the velocity estimate must be accurate. Estimates using Kalman filters require a sufficient amount of information gathered over time to converge to the true value. Further, Kalman filters may have an error in velocity estimates due to sensor noise. In some instances, the error may be on the order of 1 meter per second. For slow moving objects, this is not a reliable velocity estimate. In the illustrated example, the system 20 determines a velocity estimate using the filter 46 operating as a Low Pass filter at 70. The Low Pass filter relies on the position estimates provided by the Kalman filter. The object speed is obtained as a derivative of the object's position with respect to time. The speed estimate from the Low Pass filter will be referred to as the Bolt On Velocity in this document.

If the object 22 is moving slowly, the position estimates obtained by the Kalman filter will show a shift over time. Thus, the bounding box 56 will have moved the first distance over the time that the object 22 has been tracked. Similarly, if the object 22 is moving, the centroid will also move a second distance over the time that the object 22 has been tracked. If both the bounding box 56 and the centroid 54 have moved, the object 22 is not a stationary object. Additionally, if the object 22 is moving, the estimated velocity from the Kalman filter and the Bolt On Velocity from the Low Pass Filter should be the same, or sufficiently similar. The processor 50 compares the first and second distances and the estimated velocity and estimated speed (or Bolt On velocity) at 72. If a relationship between the first and second distances and a relationship between the estimated velocity and estimated speed indicate that the object 22 is not stationary, the object 22 is classified as a slow moving object at 82.

In some cases, additional criteria may be used to determine whether the object 22 is a slow moving object. Additional information about the bounding box 56 may be determined at 78, and these criteria may indicate that the object 22 is slow moving at 80. Several criteria may be evaluated. The system 20 may rely on just one of these criteria, all of these criteria, or any combination to classify the object 22.

For example, a variance in the range rate is useful to determine whether the object 22 is a slow moving object at 78 and 80. The compensated range rate $\dot{R}_c$ is a function of azimuth θ, which means that objects of larger size, such as vehicles, will have a higher spread in the values of $\dot{R}_c$ over time for a single object than objects with smaller sizes. Thus, a variance $\sigma_m$ of $\dot{R}_c$ is compared to a preselected threshold at 80. The variance $\sigma_m$ below the preselected threshold indicates the object is smaller than a vehicle, and is more likely to be a slow moving object, such as a pedestrian. In one example embodiment, the preselected threshold for the variance $\sigma_m$ is about 0.2. An object that satisfies this criterion may be classified as a slow moving object at 82.

The value of the compensated range rate $\dot{R}_c$ depends upon the pose of the bounding box 56. For the same object and the same speed, different values of $\dot{R}_c$ will be observed for different poses. This is explained by the relation between the poses and the spread of the azimuth θ. For a vehicle, the mean $\mu_m$ of the absolute values of the compensated range rates $\dot{R}_c$ can be high for some poses while low for other poses. However, for pedestrians, because of their smaller size, the mean $\mu_m$ of the absolute values of $\dot{R}_c$ will be smaller. The mean $\mu_m$ is compared to a preselected threshold at 80. A value of $\mu_m$ below the preselected threshold is indicative of a slow moving object. In one example embodiment, the preselected threshold for $\mu_m$ is about 2. An object that satisfies this criterion may be classified as a slow moving object at 82.

Another example criterion considered at 78 and 80 is the size of the bounding box 56. Since many slow moving objects, such as pedestrians, are smaller than vehicles, the bounding box 56 used to represent them will be smaller than a bounding box 56 for a vehicle. Thus, if the length L and width W of the bounding box 56 is below a preselected threshold size, the object 22 is more likely to be a pedestrian or other slow moving object capable of motion.

An object 22 has an empirical speed $S_e$ defined as the tracked distance moved by the bounding box 56 divided by the time elapsed while tracking the object 22. For objects that are not capable of moving fast, such as pedestrians, this empirical speed $S_e$ should always be less than 3 meters per second. An object that satisfies this criterion may be classified as a slow moving object and the illustrated example includes empirical speed as one of the criteria that is considered at 78 and 80. Objects that have a mean $\mu_m$ below a threshold, a variance $\sigma_m$ below a threshold, a length L and a width W below a threshold and an empirical speed $S_e$ below a threshold will be classified as slow moving objects at 82.

In some examples, additional criteria are useful at 78 and 80 to classify an object 22 as a slow moving object rather than a stationary object. In one embodiment, if the absolute value of compensated range rates for ambiguous detections $\dot{R}_c^a|$ exceeds a threshold, the object may be slow moving. Further because of the larger size of vehicles compared to pedestrians, an absolute value of a difference between a compensated range rate for ambiguous detections and a compensated range rate for moving detections $|\dot{R}_c^a - \dot{R}_c^m|$ will be higher than a threshold value. In one example, the threshold value for the difference $\dot{R}_c^a - \dot{R}_c^m|$ is about 0.2. If the object 22 satisfies these additional criteria, it will be classified as a slow moving object at 82.

If none of the above-noted criteria indicate that the object 22 is a slow moving object, the object 22 will be classified as stationary at 84.

In some instances, the criteria evaluated at steps 78 and 80 may not be sufficient to accurately classify the object 22. Pedestrians, for example, may be difficult to classify. Some pedestrians walk slower than others, and they may stop intermittently. Further, when humans walk, different portions of their bodies move varying amounts. In particular, the frequencies of their arms and legs may vary. When humans are walking quickly, their arms and legs swing with the same frequency, but when humans walk slowly, their arms swing twice as fast as their legs. In one example, humans walking with a speed of greater than about 0.8 meters per second will have arms and legs swinging at the same frequency, while those walking slower have arms swinging at a greater frequency than legs. For humans walking slowly, this information can be used to identify pedestrians that may otherwise have been marked as stationary objects.

When the object 22 is a pedestrian that is walking slowly, the pedestrian's torso will be within the bounding box 56. In one embodiment, walking slowly corresponds to moving with a velocity of less than about 1 meter per second. The detections generated by movement of the individual's arms and legs will be mostly outside of the bounding box 56. The processor 50 compares the detections it receives from inside of the bounding box 56 and the detections it receives from outside of the bounding box 56 at 74. If detections are collected over a period of time, then there is a high probability that a mean $\dot{R}_c$ of the absolute value of compensated range rates $\dot{R}_c$ for each detection outside of the bounding box 56 will be significantly higher than a mean $\mu_2$ of the absolute value of compensated range rates $\dot{R}_c$ for each detection inside of the bounding box 56. Thus, a ratio of $\mu_1/\mu_2$ can be used as a parameter to classify the object 22 as slow moving. The value of $\mu_1$ should also be sufficiently high to classify the object 22 as slow moving. If the ratio of $\mu_1/\mu_2$ and the value of μl each exceed respective preselected threshold values as determined at 76, the object 22 will be classified as slow moving at 82. In one example, the preselected threshold value for the ratio of $\mu_1/\mu_2$ is about 1.5. In an example, the preselected threshold value for the value of $\mu_1$ is about 0.1. In a further example, the preselected threshold value for the value of $\mu_1$ is about 0.2.

When a human is walking faster, such that the arms and legs have the same frequency, the ratio of $\mu_1/\mu_2$ will not be useful. The ratio of $\mu_1/\mu_2$ will also not be useful for slow moving objects that are not walking pedestrians, such as bicycles. However, such objects should still be classified as slow moving, rather than stationary.

In some embodiments, the system 20 may rely on all of the criteria mentioned in determining whether the object 22 is slow moving. In other embodiments, the method may go through 74 and 76, while in other embodiments, the method goes through 78 and 80. In a further embodiment, the method may go through all of these 74, 76, 78, and 80 to classify the object 22.

The example approach may be iterative. The system 20 continually emits radiation, detects reflected radiation, and estimates values based on those detections. In some embodiments, estimated state variables of detected objects are updated many times per second, and object classifications may change. For example, a previously stationary object, such as a stopped car, may become a slow moving object or a fast moving object when it starts moving. The processor 50 may repeat many of the steps represented in FIG. 5 in an iterative fashion while the host vehicle 24 is in operation or in some embodiments, only when the host vehicle 24 is travelling at speeds below a preselected host speed threshold. For example, if the host vehicle 24 is travelling on a highway, it is not likely there will be pedestrians or other slow moving objects nearby—all of the surrounding objects will be either other vehicles travelling at high speeds, or stationary objects. The preselected host speed threshold may be a speed indicative of highway travel. In one example embodiment, the preselected host speed threshold is about 20 meters per second.

The disclosed example embodiments for classifying an object as a slow moving object improve object tracking and automated or semi-automated vehicle control in an efficient manner. Example embodiments of this invention help a vehicle to accurately identify a detected object, and thus logically determine how to treat the object.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

What is claimed is:

1. A method of classifying a detected object, the method comprising:
   detecting an object;
   determining that an estimated velocity of the object is below a preselected threshold velocity requiring classification;
   assigning a bounding box to the object;
   determining a time during which the object has been detected;
   determining a first distance the object moves during the time;
   determining a speed of the object from the first distance and the time;
   determining a second distance that a centroid of the object moves during the time;
   determining a value of a compensated range rate for moving detections inside the bounding box, and a ratio of the compensated range rate for moving detections inside the bounding box to a compensated range rate for moving detections outside the bounding box; and
   classifying the object as a slow moving object or a stationary object based on a relationship between the first and second distances and a relationship between the estimated velocity and the speed.

2. The method of claim 1, wherein determining the speed of the object comprises using a Low Pass Filter.

3. The method of claim 1, wherein the determining the estimated velocity, time, and first distance comprises using a Kalman filter.

4. The method of claim 1, comprising:
   classifying the object as a slow moving object when the ratio exceeds a preselected threshold ratio.

5. The method of claim 1, comprising:
   determining whether a length and a width of the object are less than a preselected length and width.

6. The method of claim 5, comprising:
   determining whether a mean and standard deviation of compensated range rates of detections from the object are less than a preselected mean value and standard deviation value.

7. The method of claim 6, comprising:
   classifying the object as a slow moving or a stationary object based on the values of the length and width of the object and the mean and standard deviation of compensated range rates of detections.

8. The method of claim 1, comprising:
   assigning a bounding box to the object, wherein the bounding box has a preselected length and width.

9. A system for tracking a slow moving object, the system comprising:
   a tracking device configured to detect an object; and
   a processor configured to:
   determine that an estimated velocity of the object is below a preselected threshold velocity requiring classification;
   assign a bounding box to the object
   determine a time during which the object has been detected;
   determine a first distance the object moves during the time;
   determine a speed of the object from the first distance and the time;
   determine a second distance that a centroid of the object moves during the time;
   determining a value of a compensated range rate for moving detections inside the bounding box, and a ratio of the compensated range rate for moving detections inside the bounding box to a compensated range rate for moving detections outside the bounding box; and
   classify the object as a slow moving object or a stationary object based on a relationship between the first and second distances and a relationship between the estimated velocity and the speed.

10. The system of claim 9, comprising a Low Pass Filter configured to determine the speed of the object.

11. The system of claim 9, comprising a Kalman Filter configured to determine the estimated velocity, time, and first distance.

12. The system of claim 9, wherein the processor is configured to classify the object as a slow moving object when the ratio exceeds a preselected threshold ratio.

13. The system of claim 9, wherein the processor is configured to determine whether a length and a width of the object are less than a preselected length and width.

14. The system of claim 13, wherein the processor is configured to determine whether a mean and standard deviation of compensated range rates of detections from the detected object are less than a preselected mean value and standard deviation value.

15. The system of claim 13, wherein the processor is configured to classify the object as a slow moving or a stationary object based on the values of the length and width of the object and the mean and standard deviation of compensated range rates of detections.

16. The system of claim 9, wherein the processor is configured to assign a bounding box to the object, wherein the bounding box has a preselected length and width.

17. The system of claim 9, wherein the tracking device is on a vehicle.

18. The system of claim 17, wherein the vehicle is an autonomous vehicle.

\* \* \* \* \*